US011168896B2

(12) United States Patent
Davies

(10) Patent No.: US 11,168,896 B2
(45) Date of Patent: Nov. 9, 2021

(54) TEMPERATURE CONTROL OF A MODULAR BUILDING

(71) Applicant: INTEX HOLDINGS PTY LTD, Collinswood (AU)

(72) Inventor: Roger Davies, Collinswood (AU)

(73) Assignee: INTEX HOLDINGS PTY LTD, Collinswood (AU)

( * ) Notice: Subject to any disclaimer, the term of this patent is extended or adjusted under 35 U.S.C. 154(b) by 0 days.

(21) Appl. No.: 16/636,232

(22) PCT Filed: Aug. 8, 2018

(86) PCT No.: PCT/AU2018/050829
§ 371 (c)(1),
(2) Date: Feb. 3, 2020

(87) PCT Pub. No.: WO2019/028509
PCT Pub. Date: Feb. 14, 2019

(65) Prior Publication Data
US 2020/0370760 A1    Nov. 26, 2020

(30) Foreign Application Priority Data

Aug. 8, 2017 (AU) .................... 2017903153

(51) Int. Cl.
*F24D 3/14* (2006.01)
*E04C 3/04* (2006.01)
*E04C 3/32* (2006.01)
*F24F 5/00* (2006.01)

(52) U.S. Cl.
CPC ............ *F24D 3/14* (2013.01); *E04C 3/04* (2013.01); *E04C 3/32* (2013.01); *F24F 5/0089* (2013.01); *E04C 2003/0473* (2013.01)

(58) Field of Classification Search
CPC .......... F24D 3/14; F24D 3/005; F24D 11/003; F24F 5/0089; E04C 3/04; E04C 3/32; E04C 2003/0473; E04B 1/24; Y02B 30/00; F24S 10/75; F24S 20/67
See application file for complete search history.

(56) References Cited

U.S. PATENT DOCUMENTS

| | | | | |
|---|---|---|---|---|
| 3,280,530 A | * | 10/1966 | Rothenbach | E04B 9/00 52/838 |
| 4,000,850 A | | 1/1977 | Diggs | |
| 4,216,762 A | * | 8/1980 | Klaila | F24D 3/005 126/621 |

* cited by examiner

*Primary Examiner* — Frantz F Jules
*Assistant Examiner* — Martha Tadesse
(74) *Attorney, Agent, or Firm* — Sand, Sebolt & Wernow Co., LPA

(57) ABSTRACT

A modular building with a structure having various constructional elements including columns joists and rafters each including a void to accommodate pipes that carry fluid at a certain temperature, the pipes extending at least below the floor of the building through the joists that are enclosed by a base to define a cavity affecting the temperature of the air in-between the floor and the base. Air vents are provided in the floor to allow for the air flow between the cavity and the inside of the modular building.

7 Claims, 2 Drawing Sheets

TEMPERATURE CONTROL OF A MODULAR BUILDING

FIELD OF THE INVENTION

The present invention relates to regulating the temperature in a modular building and one that has particular adaptation for the use of solar energy to heat the building.

BACKGROUND TO THE INVENTION

There are numerous ways to heat a building. One can circulate ambient air that is heated using a reverse cycle air conditioner or a gas heater. Other heating types include space heaters that are located in individual rooms and where the heat is produced by burning gas, a solid fuel and by circuiting a fluid using central heating. The fuel is generally expensive may requires maintenance and the thermal performance is not effectively related to the cost since the temperature of the medium is generally high to ensure that it is then dissipated into the ambient air.

A further difficulty is that heating of a building requires significant infrastructure, a long time to install and is expensive to maintain. In addition in the case of modular buildings the heating system needs to be installed after the construction of the building that exacerbates the above problems.

The object of this invention is to provide a means of heating to alleviate the above problems, or at least provide the public with a useful alternative. It is a further object of the invention to, in some cases, use solar energy to provide heating for a building, especially a modular building.

SUMMARY OF THE INVENTION

In a first aspect the invention comprises a modular building with a structure having various constructional elements including columns joists and rafters each including a void to accommodate pipes that carry fluid of a certain temperature, the pipes extending below the floor of the building through the joists that are enclosed by a base to define a cavity affecting the temperature of the air in-between the floor and the base.

In preference the floor includes vents to enable for air to flow from the inside of the cavity into the inside of the modular building to temperature control the building.

In preference the building includes at least one solar heating element that heats water that is then fed through the fluid carrying pipes.

In preference the building includes a cooling system that cools the fluid carried by the fluid carrying pipes.

In preference the pipes are arranged in a parallel type of arrangement.

In preference where the pipes extend through the columns and the rafters also influence the temperature inside the modular building.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1:
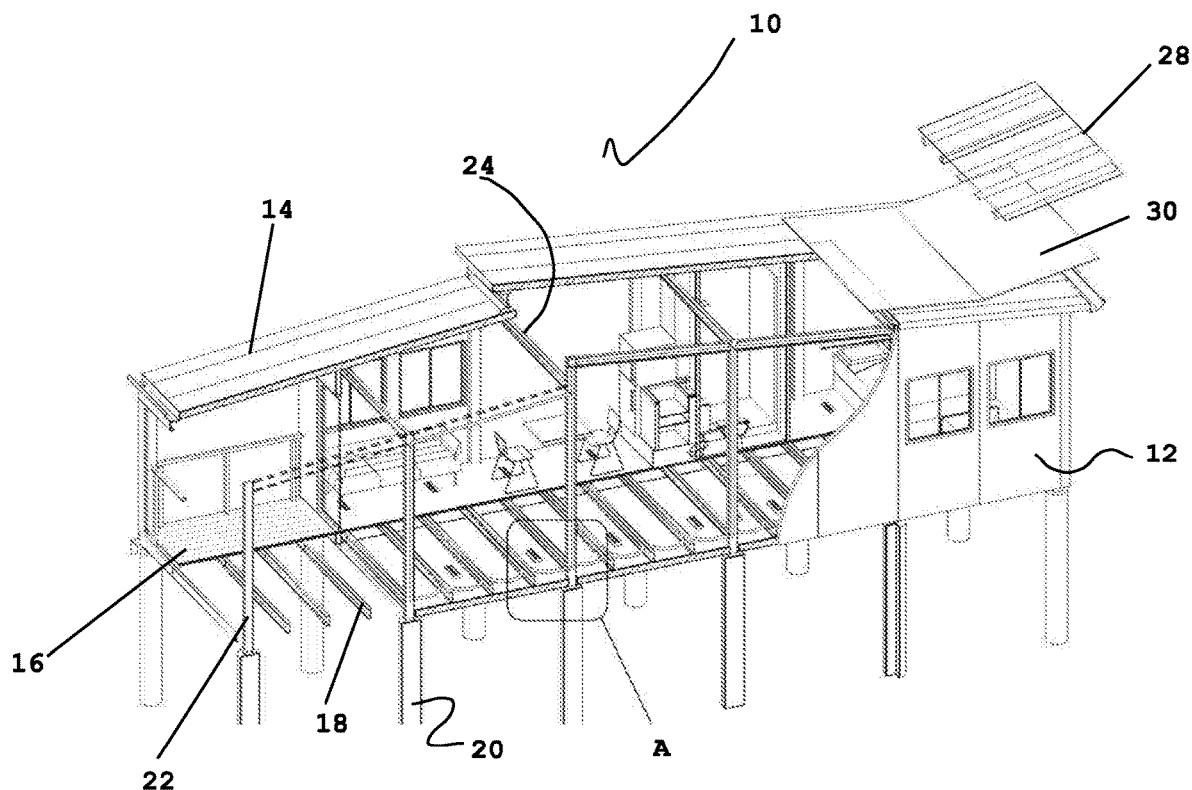
FIG. 1 illustrates a modular building incorporating a heating system according to the present invention.
Figure 2:
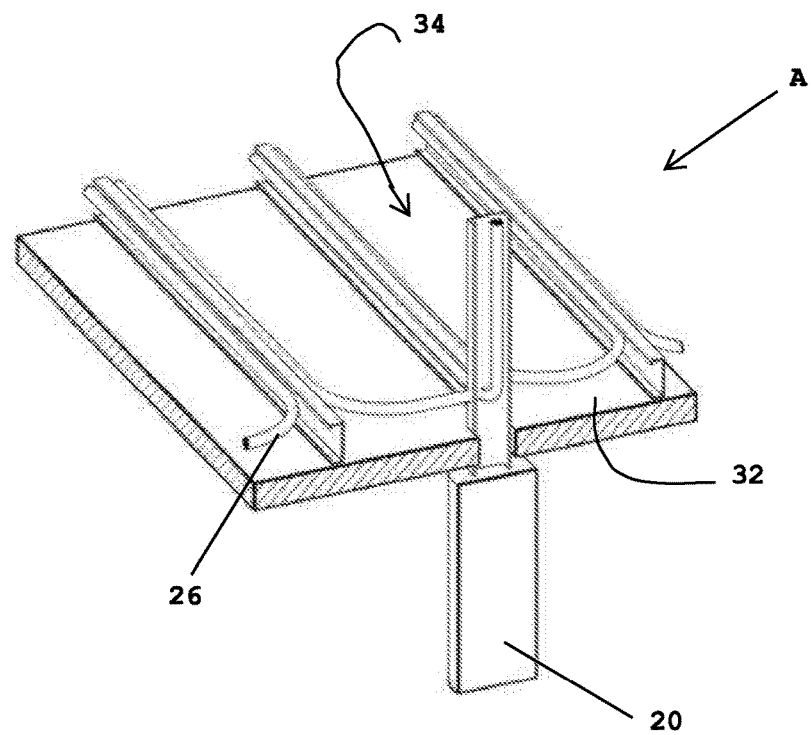
FIG. 2 is an enlarged view of section A of FIG. 1 illustrating in more detail the use of pipes in the building.
Figure 3:
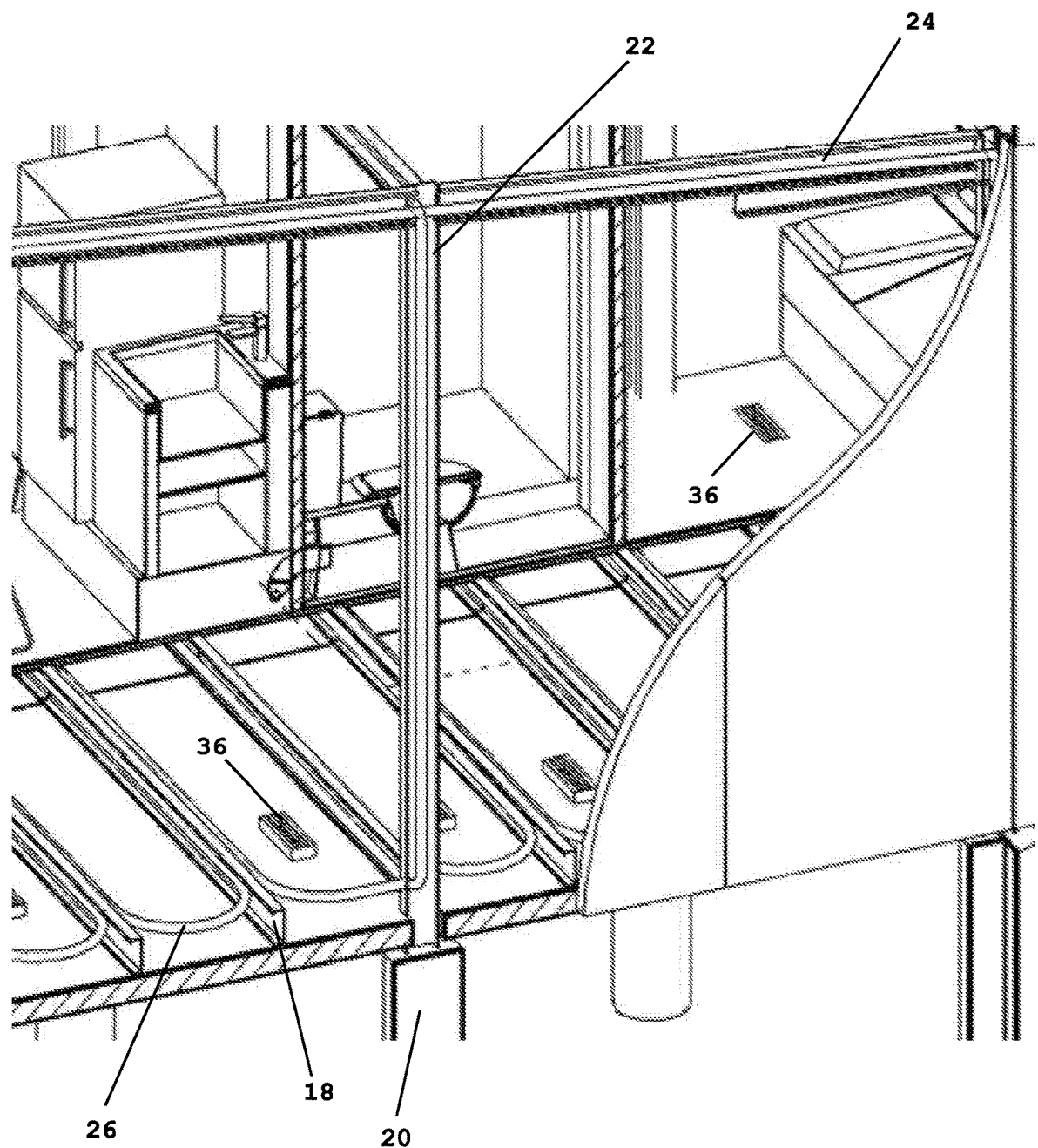
FIG. 3 is an enlarged view of the building illustrating the use of pipes in the walls and ceilings of the building.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

Referring to the Figures there is shown a modular building 10 of the type having walls 12 and roof 14 that can extend across the top of the modular building and that can also serve as the ceiling, and a floor 16. It is not intended to discuss these in more detail since they are well known in the art to the skilled addressee. All that is required that the roof is at an angle to ensure sufficient water flow during inclement weather.

Joists 18 support the floor 16 and are themselves supported on pillars 20 that extend to the ground. In some cases they extend into the ground are dug into it and can be concreted it, although the pillars may be optional and indeed replaced by other things such as foundations. Extending from the at least some of the pillars are columns 22 that can support the walls 12 and rafters 24 that extend between the columns to support the roof 14 as required by different building standards. The slope of the roof is chosen to allow for appropriate rainfall and various features like gutters and storm water pipes whilst not shown are part of the building and separate sections of the roof may incline in different directions.

Internal walls to divide the modular building into different living quarters can be inbuilt and typically extend between the columns 22 or in some cases extends between the walls. Whilst the shape of the joists, rafters and columns may be chosen from a variety of shapes they are designed to be able to accommodate various services within their shape.

As such and in a preferred embodiment they are internally void channels such as C-channels but it is not intended to limit the invention to this. The C-channels provide for the space to accommodate services such as plumbing, electrical cables, internet cables and the like to be able to extend throughout the building and to be extended through the walls 12 when required.

In particular they accommodate pipes 26 that can circulate a fluid, typically water around the building.

Whilst it is known to provide for wall and floor heating that is accommodated by injecting warm air into the cavities if any within the walls 12. Other wall and floor heating may include electrical heaters that can be simply turned off and on to heat the inside of the wall and thus pass by radiation heat in into the building internal.

A solar collector 30 is located on the roof 14 and can uses reflector 30 that heat water passing through the collector in pipes or by direct solar absorption. The water is then circulated using a pump (not shown) through the pipes 26 that extend down columns 22 and on the inside of the rafters through the building effectively dissipating the heat where the bottom of the building has a base 32 that then defines a gap or cavity 34 within which are located the joists 18, the air in the gap being heated by the pipes 26 carrying heated solar fluid.

The floor 16 may include apertures 36, typically with a grill that enable the air in the gap 34 to flow into the modular building thereby heating the interior of the building.

Given that the pipes 26 also extend within the void in the columns and may also extend within the void in the rafters the heated fluid in the pipes imparts the heat to its surroundings thus effectively heating the walls, ceiling and floor of the building. They then become radiant heaters of the building.

Although not discussed various valves may be used to control the flow of warm fluid from the solar collector to different parts of the building and the volume of the pipes may vary according what physical volume they are supposed to heat. These days, such an operation may be electronically controlled by sensors and controllable valves. Also there may be pipes laid out in parallel rather than being in a series arrangement.

To improve the efficiency, although not shown, the solar collector may be connected to a tank that houses the heated fluid. With an increased volume of fluid, the temperature of the fluid may be moderated so that the fluid that flows through the pipes is not too hot and also moderates the thermal load on the building.

The walls and the floor may be constructed of insulating material with metal skins that allow for heat to be transferred efficiently using radiant heating whilst gaps in the floor and may be at times in the walls and ceilings allow for convection to heat the building.

It is to be understood that whilst the above description was directed to heating a building there is no reason that it may not be used to cool a building. In that case, a solar collector may not be required, and the building may simply use a large water tank that is, for example, buried by the building which would cause the fluid to be cooled by the surrounding earth. It is well known that the temperature of the earth of soil even several meters underground remains at a fairly constant temperature throughout the year. This can be utilized to ensure that the temperature of the building is kept within tolerable levels throughout the year.

LIST OF COMPONENTS modular building 10
walls 12
roof 14
floor 16
joists 18
pillars 20
columns 22
rafters 24
pipes 26
solar collector 28
reflectors 30
base 32
gap 34
apertures 36

The reader should appreciate that the use of structural components that allow for the carriage of essential services including warm fluid can impact the heating of the modular building. The addition of a bottom base isolates the joists to also assist in insulating any heat loss.

Whilst emphasis has been placed on passing warm fluid through the pipes it may equally well be appropriate to pass cool fluid through the pipes to cool the inside of the building, whether that fluid comes from large thermal capacity water tanks or is pumped from underground where it may experience a steady constant yearly temperature.

There are other features shown in the drawings that do not need to be labelled such as windows, tables, chairs and so on. These are obvious to the skilled addressee and no time needs to be taken to discuss them in any detail. Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

It is understood that the pipes may be of bendable plastic material so that they can be bent or deformed to snake around the modular building.

In the present specification and claims (if any), the word "comprising" and its derivatives including "comprises" and "comprise" include each of the stated integers but does not exclude the inclusion of one or more further integers.

The invention claimed is:

1. A modular building comprising:
    a structure having various constructional elements including columns, joists, and rafters;
    a void defined in each of at least some of the columns, joists, and rafters, such that the structure includes one or more voids;
    a pipe accommodated in each of at least some of the one or more voids such that the structure includes one or more pipes, wherein the one or more pipes carry a fluid therein, and wherein at least some of the one or more pipes extend below a floor of the modular building;
    a base located a distance below the floor of the modular building such that a cavity is defined between the base and the floor, wherein the joists are located within the cavity, and wherein the fluid in the one or more pipes affects a temperature of air within the cavity; and
    apertures that are defined in the floor, said apertures enabling temperature-affected air to flow out of the cavity and into an interior of the modular building to affect temperature inside the interior of the modular building.

2. The modular building as in claim 1 further comprising at least one solar heating element that heats the fluid carried within the one or more pipes.

3. The modular building as in claim 1 further comprising a cooling system that cools the fluid carried within the one or more pipes.

4. The modular building as in claim 1 wherein the one or more pipes includes at least two pipes that are arranged in a parallel arrangement.

5. The modular building as in claim 1 where the one or more pipes, by extending through the at least some of the one or more voids in the columns and the rafters, also influence the temperature inside the interior of the modular building.

6. The modular building as in claim 1, further comprising pillars extending downwardly from the base towards a ground surface, wherein the pillars support the base and thereby the joists a distance above the ground surface.

7. The modular building as in claim 1, further comprising a grill extending across each aperture and through which the temperature-affected air flows from the cavity and into the interior of the modular building.

\* \* \* \* \*